United States Patent [19]

Nie et al.

[11] Patent Number: 5,472,678
[45] Date of Patent: Dec. 5, 1995

[54] SOL-GEL METHOD FOR PREPARING AN ALKALINE EARTH METAL BORATE

[75] Inventors: Wenjiang Nie, Chalon, France; Gustavo R. Paz-Pujalt, Rochester, N.Y.; Christian Lurin, Saint-Remy, France

[73] Assignee: Eastman Kodak Company, Rochester, N.Y.

[21] Appl. No.: 244,957

[22] PCT Filed: Dec. 9, 1992

[86] PCT No.: PCT/EP92/02838

§ 371 Date: Jun. 15, 1994

§ 102(e) Date: Jun. 15, 1994

[87] PCT Pub. No.: WO93/12037

PCT Pub. Date: Jun. 24, 1993

[30] Foreign Application Priority Data

Dec. 16, 1991 [FR] France ................................... 91 15845

[51] Int. Cl.$^6$ .................................................. C01B 35/12
[52] U.S. Cl. ............................................ 423/280; 423/279
[58] Field of Search ................................... 423/279, 280

[56] References Cited

U.S. PATENT DOCUMENTS 4,897,249  1/1990  Ross et al. ............................ 423/280
4,931,133  6/1990  Gualtieri et al. ........................ 423/279

FOREIGN PATENT DOCUMENTS 3223673  12/1983  Germany ............................... 423/279

OTHER PUBLICATIONS

European Patent Application 269385 published Jun. 1, 1988.
Chemical Abstracts citation 92:33108u (1992).
Chemical Abstracts citation 93:124874c (1993).

Primary Examiner—Wayne Langel
Attorney, Agent, or Firm—J. Jeffrey Hawley

[57] ABSTRACT

The present invention concerns a method for preparing earth alkaline metal borates.

The method comprises the steps of forming a mixture of an earth-alkaline metal alkoxide and a boron alkoxide, of hydrolysing this mixture to form a metal-borate precursor, and then coating the precursor onto a substrate and thermally treating it to form an inorganic film on the substrate.

The method is especially useful to prepare beta barium borate layers which can serve in non-linear optical devices to produce second harmonics generation.

9 Claims, No Drawings

SOL-GEL METHOD FOR PREPARING AN ALKALINE EARTH METAL BORATE

The present invention concerns a method for preparing alkaline earth metal borates and articles comprising such borates.

Beta-barium borate ($\beta$-BBO) is one of the materials having non-linear optical properties, and more particularly having the capacity in a certain range of wavelengths, to produce a second harmonic generation (frequency 2x) when it is submitted to an incident radiation of frequency x. Unlike other materials with usual sources of incident radiation, this second harmonic generation (SHG) is of sufficient amplitude to be observed and manipulated.

Another advantage of $\beta$-BBO is that its optical damage threshold is high, i.e. 3–4 times the threshold of potassium dihydrogenophosphate, which is used as a reference material in non-linear optics. This means that $\beta$-BBO can be used with short pulse, high power lasers as sources of incident radiations without being damaged. Also, $\beta$-BBO can be used for non-linear optics within a range of temperatures which is broader than for any other material.

However, to be actually usable as a non-linear integrated optical device, a material has also to be obtainable in crystalline thin film form, on appropriate substrates.

Substances such as BBO are usually prepared by solid state reaction and sintering of metal oxide and metal carbonate mixtures. However, the treatment of these physical mixtures requires prolonged grinding/heating cycles. These methods are complex, expansive, provide non-uniform films with uncontrolled stoichiometry and do not permit easily to introduce dopants in a quantitatively controlled manner. Some of these problems may be partially overcome by tedious and time consuming trial and error combinations of the chemical elements in question, in order to achieve materials and films with the desired composition ratios. Besides, certain alkoxides have an alkaline pH, and hydrolysis at alkaline pH produces powders; a stable solution is usually obtainable with the addition of acids. However, the undesirable consequence of the addition of acids is an inferior crystallinity and the increase of crystallization temperatures when the film is subjected to thermal treatments.

Because of these difficulties, there has been a strong interest in the preparation of oxide ceramics by chemical methods in order to achieve the desired stoichiometric composition and atomic level homogeneity, and to reduce processing time and temperatures. One of such methods is sol-gel method, which consists in a controlled hydrolysis of precursors which are generally alkoxides. These alkoxides are hydrolyzed and condensed to form an inorganic metal-oxygen-metal network. Further thermal treatments result in the formation of the desired crystalline phase. Sol-gel method has been described in references such as U.S. Pat. Nos. 4,789,563, 4,652,467, 4,849,252 and EP's 130,801, 232,941. Various hydrolysis methods are reported in the technical literature.

Chem. Lett. 11 (1979), 1341–1344, discloses the preparation of strontium borate by pouring a mixture of boron and strontium alkoxide into aqueous ammonia solution to form the precursor, which is decomposed by heating to form the borate.

Z. anorg. Allg. Chem. 460 (1980), pages 228–234, discloses the preparation of borates by adding alkaline earth metal to a water containing mixture of boron alkoxide in alcohol followed by boiling to obtain borate precursors.

JP-A-63293178 discloses the preparation of complex metal and boron containing compounds by reacting boron alkoxide, metal alkoxide, alcohol amines and carboxylic acid in an organic solvent. Alkaline earth metals and pH conditions are not disclosed. However, a requirement for the sol-gel method is that alkoxides must be hydrolyzed in a controlled manner. Boron alkoxides are very water-sensitive, i.e. they have a tendency to hydrolyse too rapidly and to produce powders; thus, sol-gel method was thought not to be a good candidate for preparing $\beta$-BBO, or related borates.

The present invention eliminates the above difficulties and provides a way to use the sol-gel method for preparing alkaline earth metal borates such as $\beta$-BBO with precise atomic ratios on various substrates and without requiring expensive and complex deposition systems or the preliminary preparation of powders of the desired material.

The method according to invention allows to form a borate of one or more earth alkaline metal and comprises the steps of:

(a) mixing a earth alkaline metal alkoxide with a boron alkoxide in the presence of a volatile solvent, (b) hydrolyzing this mixture at a pH between 5 and 9, and at room temperature, to form an earth alkaline metal borate precursor, (c) thermally treating the earth alkaline metal borate precursor to form an earth alkaline metal borate.

According to a preferred embodiment, the method of the invention allows to form a film of a borate of one or more earth alkaline metals on a substrate and comprises the steps of:

(a) mixing a earth alkaline metal alkoxide with a boron alkoxide in the presence of a volatile solvent, (b) hydrolyzing this mixture at a pH between 5 and 9, and at room temperature, by adding slowly a mixture of water and volatile solvent, (c) coating the resulting solution on a substrate, and (d) thermally treating the coated solution so that the solvent and water are removed and a inorganic thin film of metal borate is formed.

The term "metal" refers to any alkaline earth metal, i.e. a metal of group 2 of the Periodic Table such as, calcium, strontium and barium.

According to a specific and preferred embodiment, the method of the invention is especially suitable to prepare beta BBO, and comprises the following steps:

(a) preparation of a mixture of barium alkoxide with a boron alkoxide in the presence of a volatile solvent and at pH 6–8, (b) hydrolysis of this mixture to form a $\beta$-BBO precursor, (c) coating of the precursor obtained in step (b) on a substrate; and (d) thermal treatment of the precursor, in order to form $\beta$-BBO.

While the Applicants do not intend to be bound by theoritical considerations, they believe than an important feature of the method according to the invention is the choice of alkoxides which can undergo a controlled hydrolysis at a substantially neutral pH so as to produce by in-situ polymerization a stable, water-stable and non volatil polymeric network consisting of metal-oxygen-metal bonds, which can be then coated in thin film and thermally treated.

The solvents can be chosen from a wide range of liquids which are volatile at room temperature. The solvent should allow solubilization of the alkoxides used. The choice of the solvent (or solvents) and the amount of solvent(s) will depend on requirements such as viscosity and surface tension of the solution obtained after the hydrolysis. Viscosity and surface tension are parameters that determine the wettability and coatability of the solution on a substrate. Preferred solvents are alcohols and more preferred are lower alkanols, still more preferably C1-C10 alkanols, such as methanol, ethanol, propanols, butanols or lower alkoxy alkanols such as lower alkoxy ethanols, etc.

If desired, the surface tension can be reduced by the addition of a surfactant. Various nonionic or ionic surfactants can be used for this purpose, such as those sold under the trademark Triton by Rohm & Haas, e.g. Triton Xn (n=15, 35, 45, 100, etc).

Various boron alkoxides can be used to form the metal borate precursor. Preferred ones are those derived from lower aliphatic alcohols, i.e. those having from 1 to 8 carbon atoms such as methoxide, ethoxide, propoxide, butoxide, amyloxide etc.

An important feature of this invention is that the alkoxides chosen can be hydrolyzed in a controlled manner by the sol-gel process, at room temperature and at a pH between 5 and 9, preferably between 6 and 8 and more preferably close to the neutrality, in order both to avoid excessive alkalinity which causes the hydrolysis to produce powders, and without the addition an acids which leads to higher crystallization temperature and poor crystallinity. The hydrolysis is preferably carried out with a mixture of water and solvents, such as one or more of the aforementioned solvents. Molar ratio of water to solvent can vary within a wide range and can be preferably comprised between 0:1 and 10:1, more preferably between 1:1 and 5:1.

As previously noted, the metal alkoxide compounds and the boron alkoxide are used in the proportions desired in the final thin crystalline film. The compounds can be incorporated in the solvent in any convenient concentration at ambient temperature. Generally, a concentration is chosen which provides the desired film thickness for the process sequence.

Where the geometry of the substrate permits, uniformity and thickness of the metal-ligand coating can be controlled by spinning the substrate around an axis normal to the surface of the substrate. A significant advantage of spin coating is that the thickness of the coating at the end of spinning is determined by the contact angle and viscosity of the coating composition and the rate and time of spinning, all of which can be precisely controlled. Differences in the amount of the coating solution applied to the substrate are not reflected in the thickness of the final coating. Centrifugal forces generated by spinning cause excess material to be rejected peripherally from the article.

According to the method of the invention, after it has been hydrolyzed, the solution containing barium and boron at the desired ratios used as the precursor, is coated onto the substrate by any known coating method, such as spin coating, dip coating, spraying, doctor blading, etc. Thicker films can be obtained by repeating the coating steps. The thickness of the films depend on factors such as the viscosity of the solution prior to coating.

The resulting film is then subjected to a thermal treatment in one or more sequences, to remove solvents, water, and residual organics released from the alkoxides. Before heating at higher temperatures for removal of residual organics, a heating step under water steam at a moderate temperature can be desirable (for instance between 200° and 300° C.) in order to have the hydrolysis completed. An uncomplete hydrolysis may cause difficulties for the complete removal of residual organics at higher temperatures. The heating steps finally result in an inorganic film, which upon continued thermal treatment, is modified to produce the crystalline desired phase of metal borate. In the case of beta BBO films, after hydrolysis and condensation, the expected barium-boron-oxygen coordination is achieved in liquid phase until the crystalline β-BBO phase is obtained without boron loss during the heating treatments. The deposition process can be repeated one or several times with the removal of water and solvents after each deposition step.

Processing temperatures employed in forming the inorganic film and in subsequently converting it to a crystalline film can vary significantly, depending upon the specific film composition. In a preferred embodiment, crystallization is achieved at temperatures below 1000° C. and down to about 500° C. Optimal temperatures for crystallization may vary, depending on the ratios of the components of the film. Crystallization of β-BBO can be achieved at temperatures between 600° C. and 920° C.

To heat the film and the substrate, various methods can be used. Uniform heating can be accomplished employing any conventional oven. In some instances, however, either to protect the substrate from rising to the peak temperatures encountered by the film or simply to avoid the investment in an oven, it is contemplated that the film will be selectively heated. This can be accomplished by employing a radiant heat source such as a lamp, e.g. a quartz lamp. Lamps of this type are commercially available for achieving rapid thermal annealing of various conventional layers and can be readily applied to the practice of the invention. These lamps rapidly transmit high levels of electromagnetic energy to the film, allowing it to be brought to its crystallization temperature without placing the substrate in an oven.

After thermal treatment the layer thickness can range from about 0.05 μm to about 0.5 μm and preferably from about 0.1 μm to about 0.3 μm. Thickness are measured by methods such as ellipsometry.

Preferred substrates for the film are those which are inert or minimally interactive with the metal-borate film deposited thereon. It is generally preferred to select substrates from among materials which exhibit relatively limited interaction with the metal borate film during its formation. Description of useful substrates is provided in European Patent 334,093 or in U.S. Pat. No. 5,017,551. Also, MgO and sapphire monocrystals can be used as substrates.

To avoid the interaction between the film and the substrate, it is also possible to insert a barrier layer, e.g. layer of boron silicate between the substrate and the film.

The following examples illustrate the invention.

EXAMPLE 1

Preparation of Barium Alkoxide 24 g of metal barium in the form of pellets were slowly added to 250 ml of 2-methoxyethanol (about 0.7 molar). The exothermic reaction produces a hydrogen evolution. As the barium pellets dissolve quite slowly, the solution darkens up to exhibit a dark colouring. At the end of the reaction, the solution is cleared by filtration. The solution which will be used as such in the following step, contains 0.77 molar barium alkoxide.

EXAMPLE 2

Preparation of B-barium Borate 10 ml of the barium 2-methoxyethoxide solution in 2-methoxyethanol obtained in Example 1 ($0.77 \times 10^{-2}$ mole of barium) were mixed with 3.54 g of boron tributoxide ($1.54 \times 10^{-2}$ mole), under an inert atmosphere (nitrogen).

A mixture of water (1.11 g; 6.16×10⁻² mole) and solvent (2-methoxyethanol, 8 ml) was slowly added; the water:solvent ratio is 1:1.

The resulting sol was heated to reflux at 50° C. during 24 hours, and then is coated as on an alumina substrate.

The film was then subjected to three successive thermal treatments:

A first heating during 5 minutes at 150° C. in order to remove the solvent and water;

A second heating during 24 hours at 250° C. in the presence of water (in an oven).

A third heating during 15 minutes at 820° C. in order to perform crystallization. The film crystallization was verified by X-ray diffraction, and electron scanning microscopy.

EXAMPLE 3

Preparation of B-barium Borate

The procedure of Example 2 is repeated, except that 15 ml (1.155×10⁻² mole) of barium 2-methoxyethoxide were used and mixed with 1.28 g (0.77×10⁻² mole) of trimethoxyboxine ($B_3O_3(OCH_3)_3$).

The hydrolysis was carried out with a mixture of 0.83 of water and 12 ml of 2-methoxyethanol. A sol treated as in example 2 was obtained in order to form, after heating, a β-barium borate film.

We claim:

1. A method for preparing a borate of one or more alkaline earth metals, comprising the steps of (a) forming a mixture of a boron alkoxide and one or more alkaline earth metal alkoxides in the presence of a volatile solvent, (b) hydrolyzing said mixture at a pH between 5 and 8 by adding slowly a mixture of volatile solvent and water, to form a alkaline earth metal borate precursor, (c) coating the resulting composition of step (b) on a substrate, and (d) heating the coated composition of step (c) so that the solvents and water are removed and an inorganic thin film of alkaline earth metal borate is obtained.

2. The method of claim 1, wherein the mixture formed in step (a) also contains a soluble solvent which is volatile at room temperature.

3. The method of claim 1, wherein the mixture formed in step (a) is hydrolyzed in the presence of a room-temperature volatile solvent.

4. The method of claim 1 wherein the mixture formed in step (a) contains a volatile solvent which is an alcohol and said mixture is hydrolyzed by adding slowly a mixture of water and said alcohol.

5. The method of claim 1, wherein the alkaline earth metal is barium and the resulting borate is beat barium borate.

6. The method of claim 5, wherein the boron alkoxide is selected from the group consisting of methoxide, ethoxide, propoxide, butoxide and trimethoxyboxine.

7. The method of claim 5, wherein the barium alkoxide is selected from the group consisting of 2-methoxyethoxide and methoxide.

8. The method of claim 1, wherein the heating step comprises at least one step for removal of water and solvents, a step for the completion of hydrolysis, a step for the removal of residual organics and a step for the crystallization of the metal borate.

9. The method of claim 8, wherein the water and solvent removal step is repeated after each deposition of the materials on the substrate.

* * * * *